US011209236B2

(12) United States Patent
Mason et al.

(10) Patent No.: US 11,209,236 B2
(45) Date of Patent: Dec. 28, 2021

(54) VIBRATION DAMPENER FOR ARCHERY BOW

(71) Applicant: Gregory E. Summers, Madison Heights, VA (US)

(72) Inventors: Tristan Mason, Madison Heights, VA (US); Gregory E. Summers, Amherst, VA (US)

(73) Assignee: Gregory E. Summers, Madison Heights, VA (US)

( * ) Notice: Subject to any disclaimer, the term of this patent is extended or adjusted under 35 U.S.C. 154(b) by 54 days.

(21) Appl. No.: 16/683,329

(22) Filed: Nov. 14, 2019

(65) Prior Publication Data

US 2021/0148668 A1 May 20, 2021

(51) Int. Cl.
| | |
|---|---|
| *F16F 7/08* | (2006.01) |
| *F16F 15/04* | (2006.01) |
| *F16F 9/30* | (2006.01) |
| *F41B 5/14* | (2006.01) |

(52) U.S. Cl.
CPC ............ *F41B 5/1426* (2013.01); *F16F 7/087* (2013.01); *F16F 9/30* (2013.01); *F16F 15/04* (2013.01); *F16F 2234/02* (2013.01)

(58) Field of Classification Search
CPC .......... F41B 5/1426; F16F 15/04; F16F 15/08
USPC .................................. 188/379, 380; 124/89
See application file for complete search history.

(56) References Cited

U.S. PATENT DOCUMENTS

| | | | | |
|---|---|---|---|---|
| 2,272,852 | A | * | 2/1942 | Schaefer .................... E04G 7/14 411/337 |
| 3,412,725 | A | * | 11/1968 | Hoyt, Jr. ................. F41B 5/1426 124/84 |
| 3,472,092 | A | * | 10/1969 | Pedigo ..................... F16H 55/18 74/440 |
| 3,524,441 | A | * | 8/1970 | Jeffery ................... F41B 5/1426 124/89 |
| 3,670,712 | A | * | 6/1972 | Izuta ...................... F41B 5/1426 124/89 |
| 3,774,730 | A | * | 11/1973 | Maddux ................... F16F 7/108 188/379 |
| 3,861,815 | A | * | 1/1975 | Landaeus .............. F16D 1/0805 403/370 |
| 4,553,522 | A | * | 11/1985 | Topping ................ F41B 5/1426 124/89 |
| 4,936,283 | A | * | 6/1990 | Izuta ...................... F41B 5/1426 124/89 |

(Continued)

FOREIGN PATENT DOCUMENTS

| | | | | |
|---|---|---|---|---|
| FR | 2583152 | A1 * | 12/1986 | ............ F41B 5/1426 |
| JP | 01239394 | A * | 9/1989 | ............ F41B 5/1426 |

*Primary Examiner* — Thomas J Williams
(74) *Attorney, Agent, or Firm* — Laubscher & Laubscher, P.C.

(57) ABSTRACT

A vibration dampener for an archery bow includes an adjustable housing containing a chamber in which an elastomeric assembly is arranged. The assembly includes a cylindrical sleeve in which a central elastomeric member is arranged and a pair of elastomeric members coaxial with the central member at opposite ends of the chamber. The elastomeric members are pressurized to absorb vibrations in three dimensions from the bow during execution of an archery shot. The pressure applied to the elastomeric members is adjustable through use of a compression assembly.

11 Claims, 4 Drawing Sheets

(56) References Cited

U.S. PATENT DOCUMENTS

| | | | | |
|---|---|---|---|---|
| 5,518,347 | A * | 5/1996 | Cobb, Jr. | F16F 7/1005 |
| | | | | 409/141 |
| 6,443,673 | B1 * | 9/2002 | Etling | B23B 29/022 |
| | | | | 188/379 |
| 6,619,165 | B2 * | 9/2003 | Perkowski | B23B 29/022 |
| | | | | 82/160 |
| 9,016,268 | B2 | 4/2015 | Leven | |
| 9,766,033 | B2 | 9/2017 | Powel | |
| 2021/0148668 | A1 * | 5/2021 | Mason | F16F 15/04 |

* cited by examiner

VIBRATION DAMPENER FOR ARCHERY BOW

BACKGROUND OF THE DISCLOSURE

Professional archers often use a stabilizer with their bow to improve their accuracy. Similarly, hunters may also use a stabilizer as well. A stabilizer is typically screwed into an accessory hole on the bow, whether it be a compound or an Olympic bow. The stabilizer resists torque and absorbs vibrations in the bow when shot, thereby reducing the shock felt in the archer's hand on the bow grip. It also helps keep the bow balanced and settles the archer's arm during aiming.

To further dampen vibrations, a vibration dampener is often connected with the stabilizer.

BRIEF DESCRIPTION OF THE PRIOR ART

Vibration dampeners for archery bows are known in the patented prior art as shown in U.S. Pat. Nos. 9,016,268 and 9,766,033. For example, U.S. Pat. No. 9,016,268 discloses an adjustable mechanical vibration limiting and absorbing device including spaced groups of resilient washers arranged in a cylindrical housing. An exterior weight is operable to compress the washers so that they expand against an inner surface of the housing to absorb vibrations.

While the prior vibration dampeners operate satisfactorily, they are limited to the amount of vibration that can be absorbed. This also limits the range of vibrations that can be reduced and absorbed. The present invention was developed in order to provide improved vibration dampening capabilities in three dimensions and adjustability of the degree of vibration absorption that is available with conventional dampeners.

SUMMARY OF THE INVENTION

Accordingly, it is a primary object of the invention to provide a vibration dampener for a bow stabilizer including an adjustable housing containing a chamber and an elastomeric assembly arranged in the chamber. The elastomeric assembly is pressurized to press against inner surfaces of the housing to absorb vibrations from the bow in three dimensions.

The adjustable housing includes a base and a compression member threadably connected with the base for longitudinal displacement in pressure and release directions relative to the base to control the pressure applied to the elastomeric assembly. Preferably, the base includes a threaded cylindrical extension and the compression member is an adjustment tube containing a threaded internal surface for rotatably connecting the tube with the base. Rotation of the adjustment tube in the pressure direction axially compresses the elastomeric assembly to press the elastomeric assembly radially against the inner surface of base cylindrical portion and the inner surface of the adjustment tube. A set screw on the adjustment tube is operable to lock the tube in a selected position relative to the base. In addition, a stop screw on the base threaded extension limits displacement of the adjustment tube in the release position.

The elastomeric assembly includes a central elastomeric member and a pair of end elastomeric members arranged in the chamber coaxial with the central member. A cylindrical sleeve may be arranged in the chamber and the central elastomeric member is arranged within the sleeve. A pair of end studs are arranged in the base and adjustment tube and the end elastomeric members are mounted on the studs. Each stud includes a threaded end extending from the housing and a flange at the opposite end having an outer surface which abuts against the central elastomeric member and an inner surface which abuts against the end elastomeric member mounted on the stud. The inner surface of each stub flange includes a plurality of space projections which extend radially and engage the end elastomeric member mounted on the stud. Similarly, the base and adjustment tube include productions which engage the end elastomeric members. The projections minimize rotational movement of the end elastomeric members when the adjustment tube is displaced on the base.

BRIEF DESCRIPTION OF THE FIGURES

Other objects and advantages of the invention will become apparent from a study of the following specification when viewed in the light of the accompanying drawing, in which.

DETAILED DESCRIPTION

Figure 1:
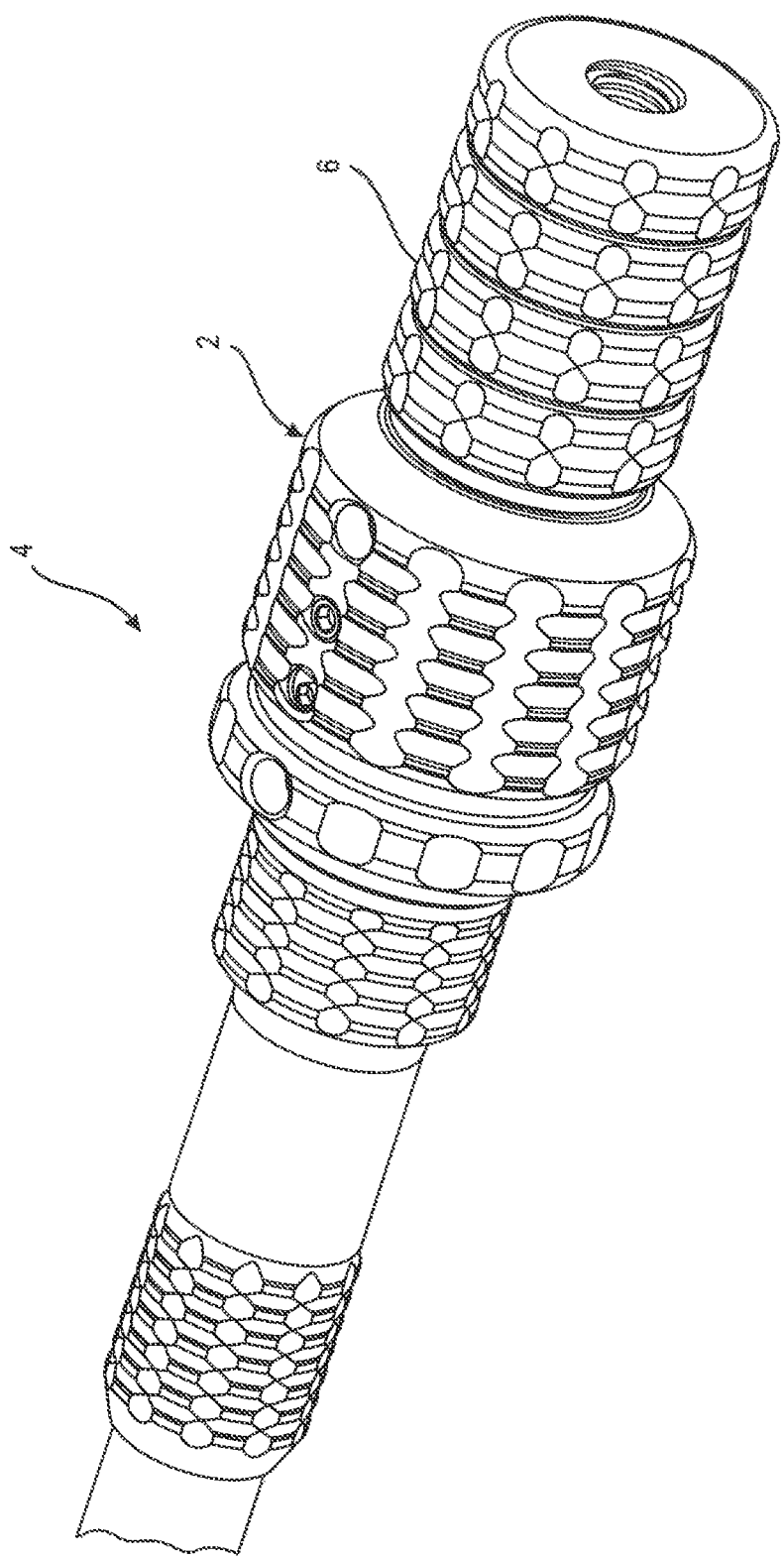
FIG. 1 is a front perspective view of a first embodiment of a vibration dampener mounted on an archery bow stabilizer according to the disclosure.
Figure 2:
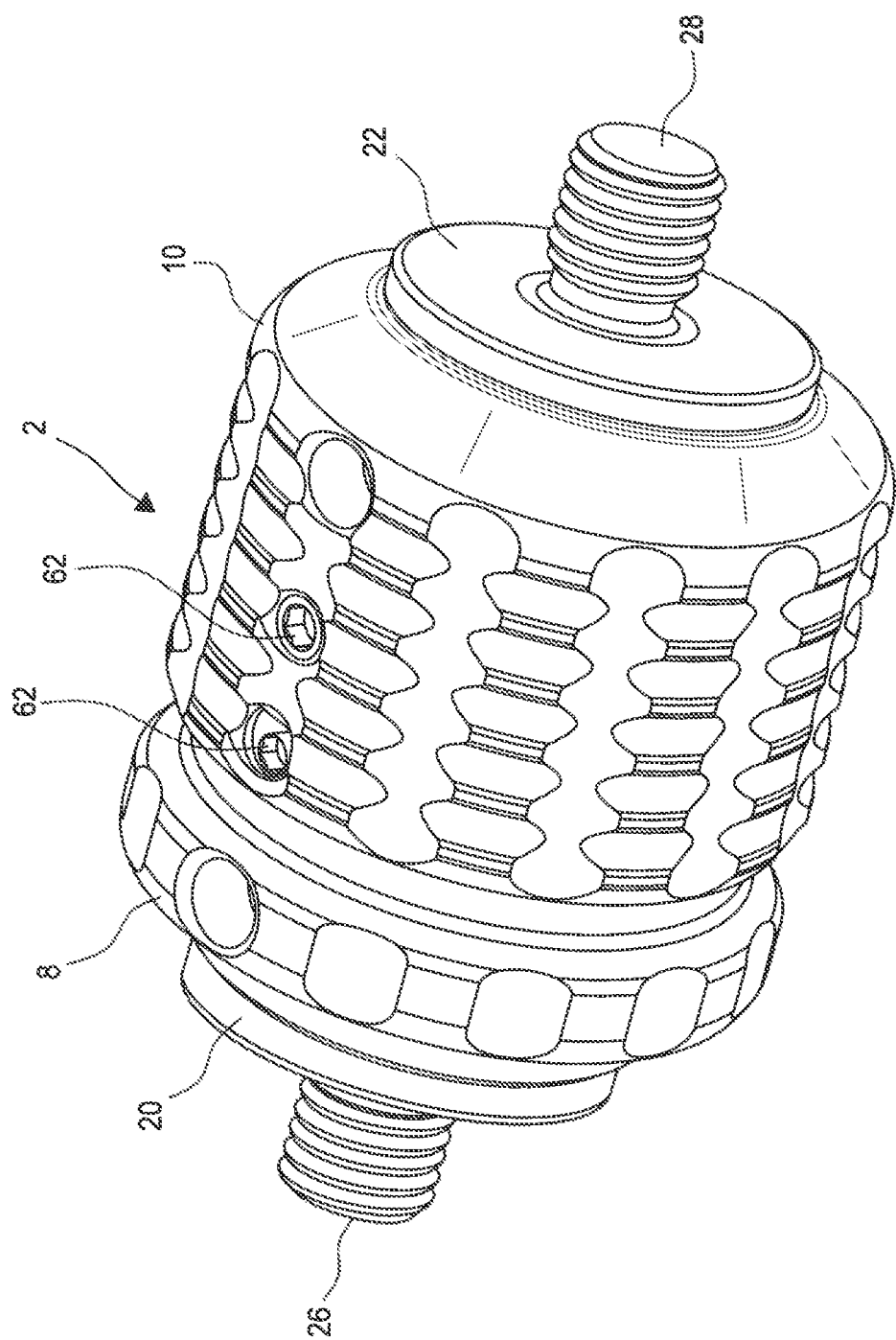
FIG. 2 is a perspective view of the dampener of FIG. 1.

A vibration dampener 2 for an archery bow stabilizer 4 is shown in FIG. 1. The dampener is mounted on the stabilizer, typically via a screw connection. A plurality of annular weights 6 may also be mounted on the stabilizer adjacent to one or both ends of the dampener. The dampener will be described in more detail in connection with FIGS. 2-4.

Figure 3:
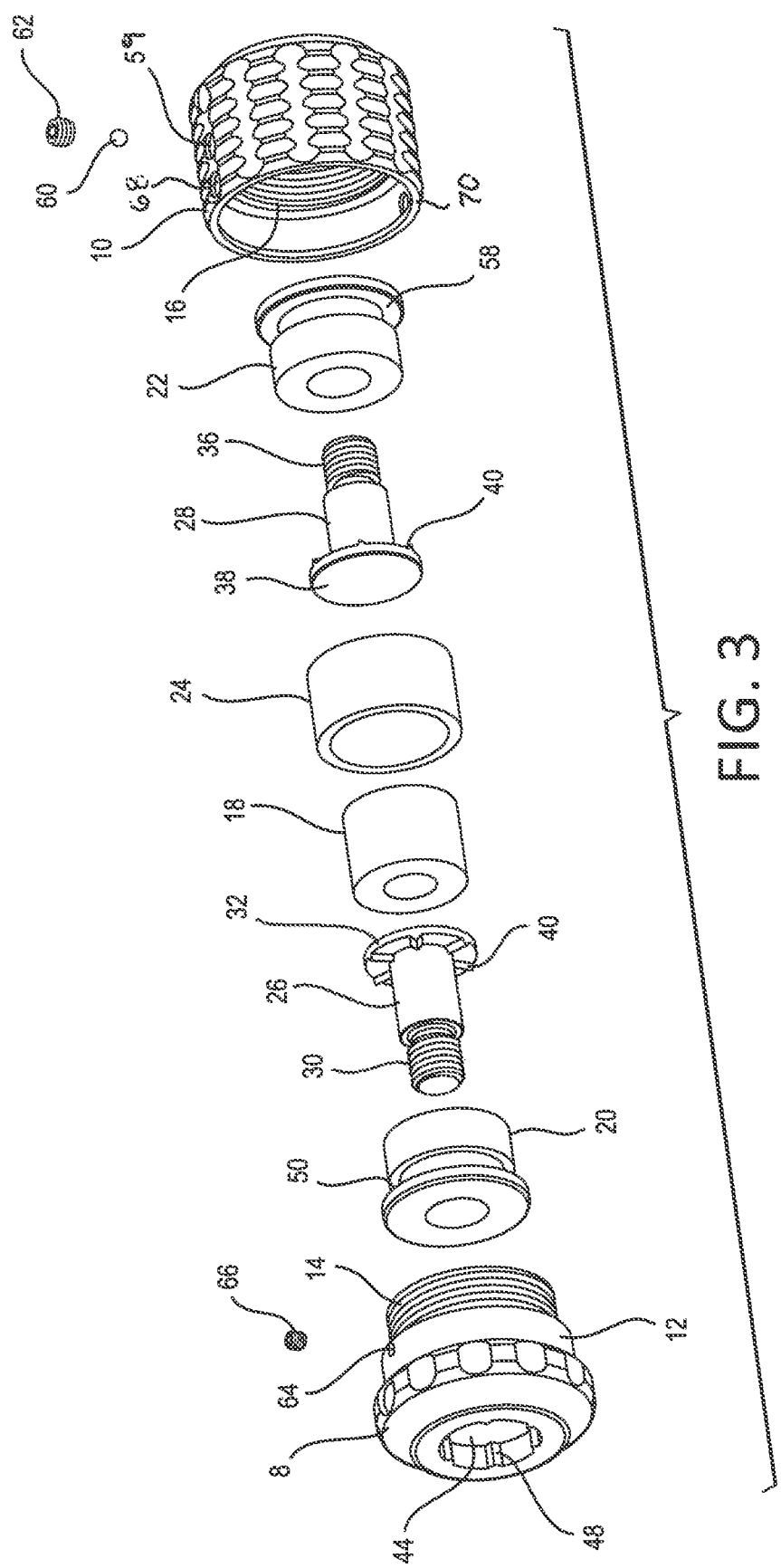
FIG. 3 is an exploded perspective view of the dampener of FIG. 1.
Figure 4:
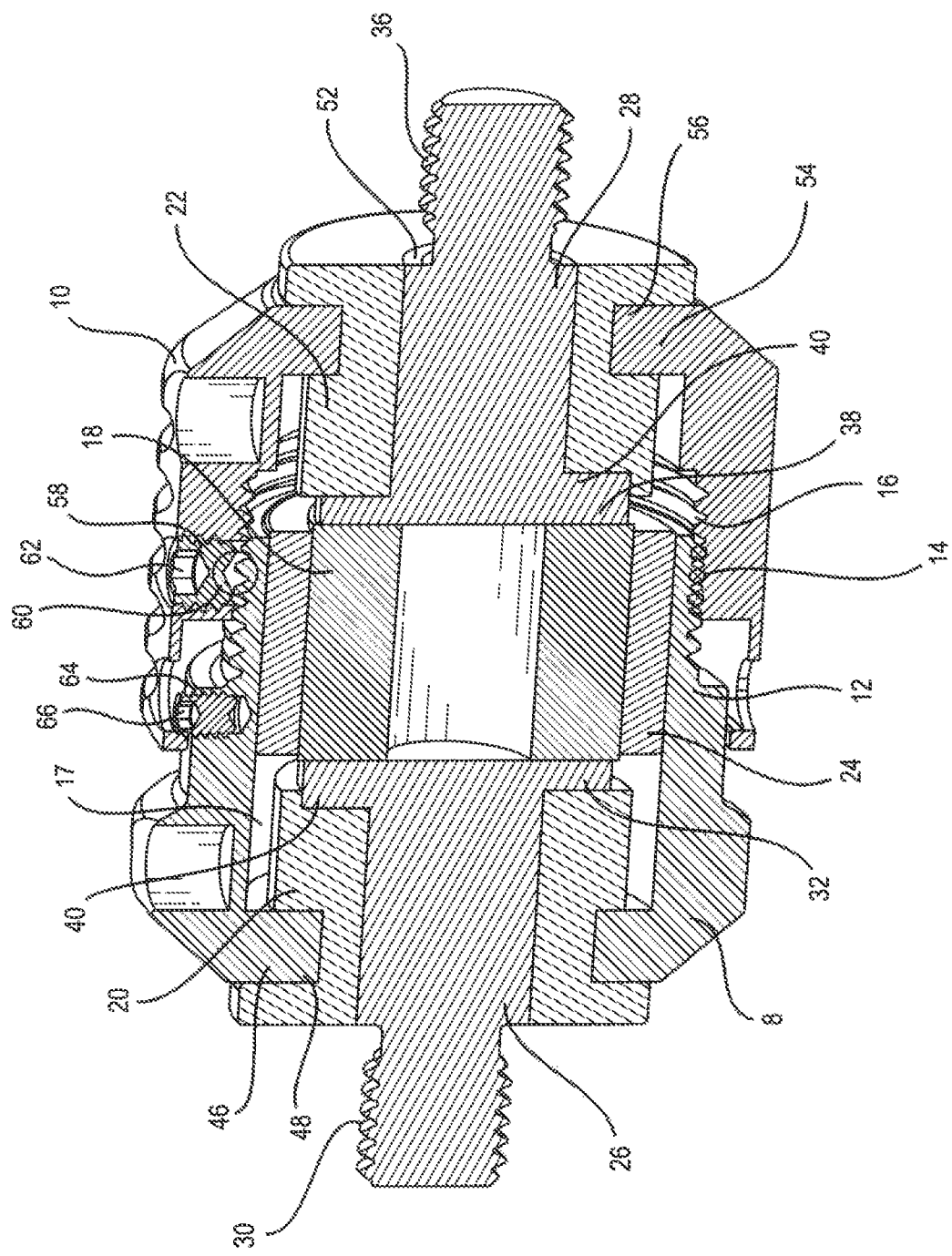
FIG. 4 is a perspective sectional view of the assembled dampener of FIG. 1 taken along its axis.

Referring to FIGS. 3 and 4, the vibration dampener includes an adjustable housing which has a longitudinal axis. The housing in turn includes a base 8 and a compression member 10 which is axially adjustable relative to the base. The base is preferably connected with the bow side of the stabilizer and includes a cylindrical coupler portion 12 extending from one surface thereof. The exterior surface of the coupler portion contains threads 14. The compression member is in the form of an adjustment tube and includes threads 16 on an inner surface thereof. The adjustment member is thus threadably connected with the coupler portion of the base and is axially displaced relative to the base depending on the direction of rotation of the tube. Owing to the configuration of the base and adjustment, a chamber 17 is defined within the housing as shown FIG. 4.

An elastomeric assembly is arranged in the housing chamber. Preferably, this assembly includes a central elastomeric member 18 and a pair of end elastomeric members 20, 22 which are coaxial with the central elastomeric member. The members are formed of a material capable of absorbing vibrations. A suitable elastomeric material is rubber, but other synthetic materials which are capable of absorbing vibrations are usable as well. The material has a certain degree of flexure which allows the members to be compressed when pressure is applied and then return to its natural configuration when pressure is released.

The central elastomeric member 18 has a generally cylindrical configuration. It is arranged in a cylindrical sleeve 24 which is arranged in the housing chamber. As shown in FIG. 4, the sleeve 24 is arranged in the coupler portion 12 of the base 8.

Each of the end elastomeric members 20, 22 contain an axial through opening for receiving a stud. Thus, the end elastomeric member 20 toward the base of the dampener is mounted on a stud 26 and the end elastomeric member 22 toward the adjustment tube 10 is mounted on a stud 28 as shown in FIG. 4. The stud 26 has a threaded end 30 and a radially extending flange 32 at the other end and the stud 28 has a threaded end 36 and a radially extending flange 38 at the other end. When assembled, the outer surfaces of the flanges of the studs 26, 28 abut against the end surfaces of the central elastomeric member 18. The threaded ends of the studs extend from the housing and facilitate connection with the bow stabilizer and/or the weights. The inner surfaces of the flanges of the studs 26, 28 include projections 40 which engage the adjacent end elastomeric member when the dampener is assembled as will be explained in more detail below.

The base 8 contains a through opening 44 which communicates with the chamber and from which the threaded end 30 of the stud 26 extends. An annular lip 46 of the base surrounds the opening 44. This lip also includes spaced projections 48 which engage the end elastomeric member 20. To facilitate mounting of the stud 26 and end elastomeric member 20 on the base, the end elastomeric member contains an annular groove 50 which receives the lip 46 of the base. The projections 48 thus engage the bottom surface of the annular groove 50 of the end elastomeric member 20. In a similar manner, the adjustment tube 10 contains a through opening 52 which communicates with the chamber and from which the threaded end 36 of the stud 28 extends. An annular lip 54 of the adjustment tube surrounds the opening 52 and includes spaced projections 56 which engage the end elastomeric member 22 in an annular groove 58 of the member which receives the lip 54 of the adjustment tube.

With the dampener assembled as shown in FIG. 4, the compression member/adjustment tube 10 is operable to adjust the dampening effect of the dampener 2. Rotation of the adjustment tube displaces the member axially relative to the base. As the compression member is rotated in a first direction, the adjustment tube is displaced in a pressure direction toward the base. This compresses the studs 26, 28 and end elastomeric members 20, 22, respectively, inwardly against the central elastomeric member 18 to axially compress the central elastomeric member. The axial compression causes the central elastomeric member to expand radially against the inner wall surface of the cylindrical sleeve 24. As the displacement of the compression member toward the base of the dampener increases, the compression of the elastomeric assembly increases as well. As the compression of the elastomeric member increases, the ability to absorb vibrations changes as the adjustable dampener becomes stiffer allowing more weight to be added without sag. Accordingly, the dampening effect of the dampener can be adjusted by the archer to his or her personal preference by rotating the adjustment tube. Rotation of the adjustment tube in the opposite or release direction decreases the pressure on the elastomeric assembly so that the elastomeric members may return to their normal configuration.

The three piece elastomeric assembly of the dampener affords absorption of vibrations in three dimensions: along the axis of the dampener, laterally within the dampener, and radially from the dampener axis. This superior dampening effect increases the overall vibration absorption of the dampener.

The projections 40 on the stud flanges, the projections 48 on the base, and the projections 56 on the adjustment tube engage the end elastomeric members 20, 22 to prevent them from rotating about their axes relative during displacement of the adjustment tube in the pressure and release directions.

Once the adjustment tube 10 has been adjusted to define the amount of vibration that may be absorbed by the elastomeric assembly, and thus the dampening effect of the dampener, the adjustment tube can be locked into place. Accordingly, the adjustment tube includes a radial threaded opening 59 in which an acetyl plastic or nylon ball 60 is arranged. A set screw 62 is threaded into the opening 59 and squeezes the ball against the threaded surface of the base coupler portion 12. Pressure from the set screw and ball prevents the adjustment tube from rotating relative to the base 8 and thus maintains the adjustment tube in the selected position without damage to the threads.

The base, adjustment tube, cylindrical sleeve, and studs are all formed of a durable material such as metal or a synthetic plastic/ceramic material, whereas the elastomeric members are formed of a more pliable material such as rubber.

In a preferred embodiment of the adjustable vibration dampener, upper and lower limits to the dampening pressure can be established to improve the performance of the dampener. The external diameter of the adjustment tube is less than the external diameter of the portion of the base 8 from which the coupler portion 12 extends. Thus, as the adjustment tube is rotated in the pressure direction, the external diameter of the tube abuts the external diameter of the base, thereby limiting the displacement and thus the maximum pressure applied to the elastomeric assembly.

Rotations of the adjustment tube in the release direction is also restricted. To this end, the base coupler portion 12 contains a radial threaded opening 64 which receives a set screw 66 which passes through a hole 68 in the adjustment tube. The inner surface at the open end of the adjustment tube contains an annular lip 70. The set screw is set to project from the threaded opening and is engaged by the lip to limit the movement of the adjustment tube in the release direction. By way of example, the maximum rotation of the adjustment tube in the release and pressure directions is approximately two revolutions. If there were no restrictions on the longitudinal movement of the adjustment tube, the elastomeric assembly would not function properly to absorb vibrations. That is, if the elastomeric members are not pressurized enough to press against the cylindrical sleeve when the bow is operated to shoot an arrow, the vibration forces would not be contained within the central elastomeric member by the sleeve, thereby rendering the device ineffective in reducing vibration. Similarly, if the elastomeric members are pressurized above their limits of elasticity, they become too rigid, thereby reducing their ability to absorb vibrations.

When the vibration dampener is tightened to the maximum amount of pressure where the adjustment tube 10 is rotated until it engages the base 8, all three elastomeric members are pressurized. The central elastomeric member 18 is fully compressed against the flanges 32, 38 of the studs 26, 28 and bulges outwardly into full contact with the sleeve 24 and both end elastomeric members 20, 22 are pressurized even greater than the initial pressure provided by the studs when the end members are mounted thereon. All three elastomeric members supply varied pressures to reduce radial axis vibrations while the end elastomeric members reduce vibrations longitudinally and laterally.

In order to disassemble the vibrations dampener, the set screw 66 is removed from the base which allows the adjustment tube to be rotated fully in the release direction until its threads disengage the threads of the base.

While the preferred forms and embodiments of the archery stabilizer tube have been illustrated and described, it will be apparent to those of ordinary skill in the art that various changes and modifications may be made without deviating from the novel concepts thereof.

What is claimed is:

1. An adjustable vibration dampener, comprising
   (a) an adjustable housing containing a chamber, said housing including a base and a compression assembly threadably connected with said base for longitudinal displacement between pressure and release positions; and
   (b) an elastomeric assembly arranged within said housing chamber, said elastomeric assembly having a cylindrical configuration and containing an empty axial chamber, said compression assembly applying increasing pressure on said elastomeric assembly as said compression assembly is displaced from said release position to said pressure position to press said elastomeric assembly against an inner surface of said housing, whereby adjustment of said housing controls the degree of vibration absorption by said elastomeric assembly in three dimensions.

2. An adjustable vibration dampener as defined in claim 1, wherein said base has a threaded extension and said compression assembly includes an adjustment tube containing a threaded internal surface for rotatably connecting said adjustment tube with said base.

3. An adjustable vibration dampener as defined in claim 2, wherein said adjustment tube contains a threaded radial opening, and further comprising a ball and a set screw arranged in said threaded radial opening, said set screw being operable to press said ball against said base member to lock said adjustment tube in a selected position relative to said base.

4. An adjustable vibration dampener as defined in claim 3, wherein said base contains a threaded radial opening and further comprising a stop screw arranged in said base threaded opening to limit displacement of said adjustment tube in said release direction.

5. An adjustable vibration dampener as defined in claim 2, wherein said elastomeric assembly includes a central elastomeric member and a pair of end elastomeric members arranged in said chamber and coaxial with said central elastomeric member.

6. An adjustable vibration dampener as defined in claim 5, Wherein said elastomeric assembly further includes a central cylindrical sleeve arranged in said housing chamber, said central elastomeric member being arranged in said cylindrical sleeve.

7. An adjustable vibration dampener as defined in claim 6, and further comprising a pair of end studs arranged within said base and adjustment tube, respectively, coaxial with said central and end elastomeric members, said end elastomeric members each containing central openings for receiving said end studs, respectively.

8. An adjustable vibration dampener as defined in claim 7, wherein each end stud includes a threaded end which extends externally of said housing and a flange at an opposite end having an outer surface which abuts against said central elastomeric member and an inner surface which abuts against an end elastomeric member, respectively.

9. An adjustable vibration dampener as defined in claim 8, wherein said flange inner surface includes a plurality of spaced projections which engage said end elastomeric members, respectively, when said adjustment tube is displaced in said pressure direction.

10. An adjustable vibration dampener as defined in claim 9, wherein said base and said adjustment tube each include projections on inner surfaces thereof, respectively, which engage said end elastomeric members to minimize rotational movement of said end elastomeric members when said adjustment tube is displaced relative to said base.

11. An adjustable vibration dampener as defined in claim 5, wherein said end elastomeric members each contain an annular recess and wherein said base and said adjustment member each include a radial flange which is arranged in a respective annular recess of said end elastomeric members.

* * * * *